(12) United States Patent
Gatti et al.

(10) Patent No.: US 8,798,808 B2
(45) Date of Patent: Aug. 5, 2014

(54) SERVICE STATION MAINTENANCE MODE FOR EXTENDED RANGE ELECTRIC VEHICLES AND HYBRID VEHICLE APPLICATIONS

(75) Inventors: Marco J. Gatti, Southgate, MI (US); Paul A. Bauerle, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 860 days.

(21) Appl. No.: 13/015,710

(22) Filed: Jan. 28, 2011

(65) Prior Publication Data

US 2012/0197513 A1    Aug. 2, 2012

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *F02N 11/08* | (2006.01) |
| *G06F 19/00* | (2011.01) |
| *G06G 7/70* | (2006.01) |

(52) U.S. Cl.
USPC .............................. 701/2; 123/179.2; 701/113

(58) Field of Classification Search
CPC ...... Y02T 10/48; B60W 10/06; F02D 41/042; F02D 41/062; F02N 11/0818; F02N 2200/0801
USPC ................. 73/114.58, 114.59, 114.6, 114.61, 73/114.62; 123/179.2, 179.3, 179.4; 701/2, 32.4, 110, 112, 113, 412
See application file for complete search history.

(56) References Cited

U.S. PATENT DOCUMENTS

| | | | | |
|---|---|---|---|---|
| 2002/0088419 | A1* | 7/2002 | Wisnia et al. | 123/179.2 |
| 2008/0068208 | A1* | 3/2008 | Hanselman | 340/825.72 |
| 2009/0248267 | A1* | 10/2009 | Boecker | 701/70 |
| 2011/0071701 | A1* | 3/2011 | Holub et al. | 701/2 |
| 2011/0288743 | A1* | 11/2011 | Smith | 701/102 |
| 2012/0277982 | A1* | 11/2012 | Weaver | 701/112 |
| 2013/0211623 | A1* | 8/2013 | Thompson et al. | 701/2 |

* cited by examiner

*Primary Examiner* — Stephen K Cronin
*Assistant Examiner* — Sizo Vilakazi
(74) *Attorney, Agent, or Firm* — Quinn Law Group, PLLC

(57) ABSTRACT

A method of controlling an Extended Range Electric Vehicle (EREV) or a hybrid vehicle that includes an internal combustion engine (ICE) that is capable of automatically starting in response to a pre-defined event includes determining if the vehicle is within a pre-defined distance of a service station, determining if the ICE is running, determining if the vehicle is in an ignition on mode or in an ignition off mode, and automatically starting the ICE when the vehicle is within the pre-defined distance of the service station, the engine is not running and the ignition is in the ignition on mode to notify a service technician that the ICE is in the ignition on mode.

20 Claims, 1 Drawing Sheet

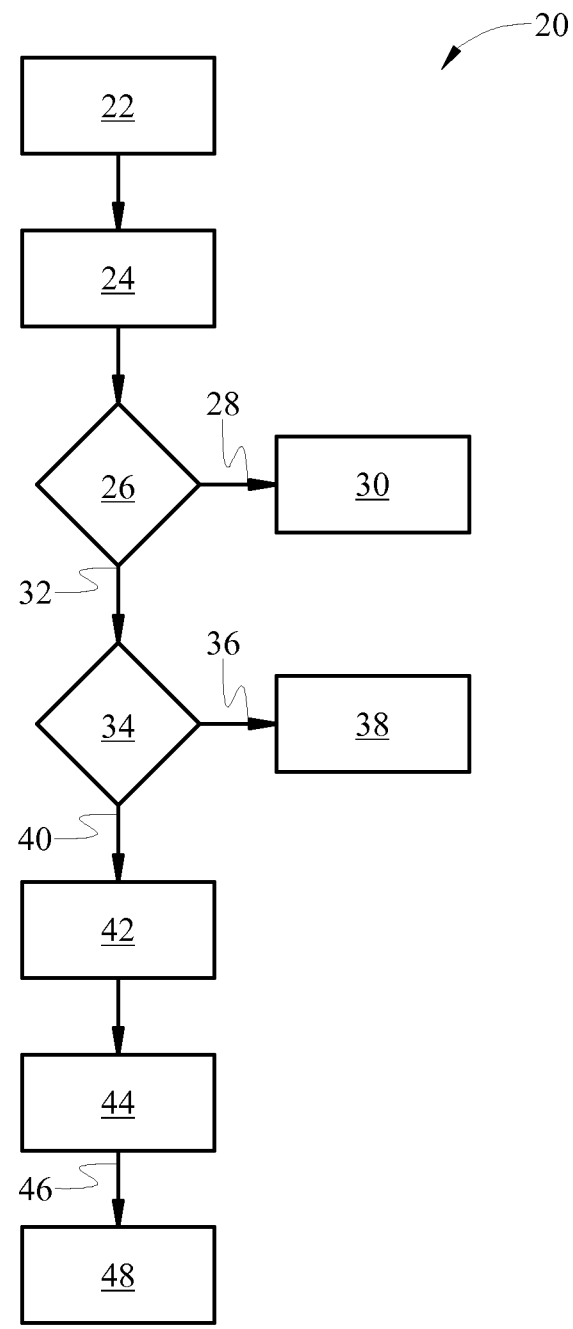

SERVICE STATION MAINTENANCE MODE FOR EXTENDED RANGE ELECTRIC VEHICLES AND HYBRID VEHICLE APPLICATIONS

TECHNICAL FIELD

The invention generally relates to a method of controlling either an Extended Range Electric Vehicle (EREV) or a hybrid vehicle that includes an internal combustion engine that is capable of automatically starting in response to a pre-defined event, to allow for service of the vehicle.

BACKGROUND

Extended Range Electric Vehicles and hybrid vehicle applications typically include an internal combustion engine that only runs in brief intervals during the operation of the vehicle. The internal combustion engine may automatically start to run in response to a pre-defined event, including but not limited to a low battery charge, a sudden acceleration request by a driver, etc. For some service applications of the EREVs and/or the hybrid vehicles, a service technician must ensure that the internal combustion engine is not capable of automatically starting. In order to ensure that the internal combustion engine is not capable of automatically starting, the service technician may switch an ignition switch of the vehicle from an ignition on mode, which allows for the operation of the internal combustion engine, to an ignition off mode, which turns the internal combustion engine off and prevents the internal combustion engine from starting.

SUMMARY

A method of controlling a vehicle having an internal combustion engine that is capable of automatically starting in response to a pre-defined event is provided. The method includes detecting the presence of a service station within a pre-defined distance of the vehicle, determining if the vehicle is in an ignition on mode or in an ignition off mode, and determining if the internal combustion engine is running or is not running when the vehicle is in the ignition on mode. The method further includes automatically starting the internal combustion engine when the vehicle is within the pre-defined distance of the service station, the internal combustion engine is not running, and the vehicle is in the ignition on mode. The internal combustion engine is automatically started to notify a service technician that the vehicle is in the ignition on mode.

A method of servicing an extended range electric vehicle or a hybrid vehicle having an internal combustion engine capable of automatically starting in response to a pre-defined event is also provided. The method includes tracking the location of the vehicle with a Global Positioning Satellite device to determine the location of the vehicle, and comparing the tracked location of the vehicle to a location of a known service station stored in a memory to determine if the vehicle is within a pre-defined distance of the service station. The method further includes determining if the vehicle is in an ignition on mode or in an ignition off mode, determining if the internal combustion engine is running or is not running when the vehicle is in the ignition on mode, and sensing a speed of the vehicle. The internal combustion engine is automatically started when the vehicle is within the pre-defined distance of the service station, the internal combustion engine is not running, the vehicle is in the ignition on mode, and the speed of the vehicle is less than a pre-defined speed. The internal combustion engine is automatically started to notify a service technician that the vehicle is in the ignition on mode. Operation of the internal combustion engine is maintained until the vehicle is switched to the ignition off mode when the vehicle is within the pre-defined distance of the service station, the internal combustion engine is running, and the vehicle is in the ignition on mode. The method further includes detecting an override signal from a scan tool, and stopping the operation of the internal combustion engine upon detection of the override signal when the vehicles is within the pre-defined distance of the service station, the internal combustion engine is running, and the vehicles is in the ignition on mode.

Accordingly, the internal combustion engine is automatically started once the vehicle is within the pre-defined distance of the service station to let the service technician know that the vehicle is in the ignition on mode and prevent the internal combustion engine from unexpectedly starting during service of the vehicle, thereby preventing unintended damage to components of the vehicle and providing a safe work environment for the service technician. If the service technician must service the vehicle with the ignition in the ignition on mode and the internal combustion engine not running, the service technician may connect a scan tool to the vehicle, which signals the vehicle to stop operation of the internal combustion engine, i.e., turn off the internal combustion engine, even though the vehicle would otherwise automatically start the internal combustion engine to prevent the unexpected start of the internal combustion engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a flowchart showing a method of controlling a vehicle.

DETAILED DESCRIPTION

Referring to FIG. 1, wherein like numerals indicate like parts throughout the several views, a method of controlling an Extended Range Electric Vehicle (EREV) and/or a hybrid vehicle application, is generally shown at 20. The method 20 may be embodied as an algorithm operable on an electronic control unit of the vehicle. The electronic control unit responsible for performing the below described method 20 may be in communication with all other control units and/or sensors of the vehicle to send and receive information therebetween as needed.

The vehicle includes an internal combustion engine that is capable of automatically starting in response to a pre-defined event. For example, the internal combustion engine may automatically start when a detected charge on a battery is low, or when a sudden increase in acceleration is requested by a driver. It should be appreciated that any number of pre-defined events may exist that trigger the automatic starting of the internal combustion engine.

In order to service the vehicle, a service technician may wish to ensure that the internal combustion engine does not automatically start. The service technician may prevent the internal combustion engine from automatically starting by ensuring that an ignition of the vehicle is in an ignition off position. If the ignition is in an ignition on position, the vehicle may automatically start the internal combustion engine if one of the pre-defined events should occur while the vehicle is being serviced. Accordingly, the service technician may wish to turn the ignition from the ignition on position to the ignition off position to prevent the internal combustion engine from starting during service of the vehicle. To that end, the vehicle includes a service garage maintenance mode that operates to notify the service technician that the ignition of the vehicle is in the ignition on position.

The vehicle may initiate the service garage maintenance mode when the vehicle comes within a pre-defined distance of a service station and the speed of the vehicle drops below a pre-defined speed. Accordingly, the method 20 includes sensing a speed of the vehicle, indicated by block 22. The speed of the vehicle may be sensed in any suitable fashion, including but not limited to wheel speed sensors or the like. Additionally, the speed of the vehicle may be sensed indirectly through one or more control modules of the vehicle. As several different control systems of the vehicle require the speed of the vehicle to perform their respective operations, the speed of the vehicle may be obtained by referencing one or more of the vehicle control modules through a vehicle network.

The pre-defined speed may be set to any desired limit suitable to indicate that the vehicle is not merely passing by a service station, but intends to stop at the service station. For example, the pre-defined speed may be set equal to or less than four miles per hour (4 mph). However, the pre-defined speed may be defined to include a speed greater than 4 mph.

The method 20 further includes detecting the presence of a service station within the pre-defined distance of the vehicle, indicated by block 24. The pre-defined distance may be defined to equal any desired distance suitable to indicate that the vehicle is not merely passing by the service station, but intends to stop at the service station. For example, the pre-defined distance may be defined as equal to or less than one hundred feet (100'), or may be defined as equal to or less than twenty feet (20'). However, the pre-defined distance may include a distance greater than one hundred feet. Furthermore, each known service station may include a specific pre-defined distance suitable to the specific layout and location of the service station. As such, the pre-defined distance may vary amongst different service stations.

Detecting the presence of the service station within the pre-defined distance may include tracking the location of the vehicle with a Global Positioning Satellite device to determine the location of the vehicle. Many vehicles are equipped with GPS devices and/or systems that continuously track the position of the vehicle. This information may be utilized and compared to the known locations of service stations. For example, the known location of all existing service stations may be stored in a memory. The location of the vehicle obtained through the GPS device may be compared to the locations of the service station stored in memory to determine if the vehicle is within the pre-defined distance of the service station.

The location of the known service stations may be stored in a memory of the vehicle, such as points of interest within the GPS device of the vehicle. If stored within the memory of the vehicle, the locations of the service stations may be periodically updated, for example through a wireless connection. Alternatively, the location of the known service stations may be stored in a memory of a remote computer. For example, many vehicles are equipped with "OnStar", which wirelessly connects the vehicle with a remote computer. This wireless connection may transmit the location of the vehicle to the remote computer, and let the remote computer compare the location of the vehicle to the location of the known service stations stored on the memory of the remote computer. When the remote computer identifies a service station within the pre-defined distance of the vehicle, the remote computer may then notify the vehicle of such in order for the vehicle to initiate the service garage maintenance mode.

Alternatively, detecting the presence of the service station may include receiving a signal indicating that the vehicle is within the pre-defined distance of the service station, and that the vehicle should initiate the service garage maintenance mode. The signal may be sent from the service station, for example through a wireless ":Bluetooth" connection. Alternatively, the signal may be sent from a remote location, such as through the "OnStar" or other similar system.

The method 20 further includes determining if the vehicle is in the ignition on mode or in the ignition off mode, indicated by block 26. If the vehicle is in the ignition off mode, the internal combustion engine may not be automatically started. However, if the vehicle is in the ignition on mode, which the vehicle would have to be in order to be in motion, then the internal combustion engine is capable of automatically starting. The vehicle may determine if the ignition is in the ignition on mode or the ignition off mode in any suitable manner. For example, the vehicle may query an engine control unit as to the current mode of the ignition, i.e., the ignition on mode or the ignition off mode, in order to determine if the ignition is in the ignition on mode or the ignition off mode. Alternatively, a sensor may sense the position of an ignition switch to determine which ignition mode the vehicle is currently operating in.

If the ignition is in the ignition off mode, indicated at 28, then no action is required, indicated by block 30. When the vehicle is in the ignition on mode, indicated at 32, the method 20 further includes determining if the internal combustion engine is running or is not running, indicated by block 34. The vehicle may determine if the internal combustion engine is running or is not running in any suitable manner. For example, the vehicle may query an engine control unit as to the current disposition of the internal combustion engine to determine if the engine is running or is not running. Alternatively, the vehicle may reference one or more sensors, such as but not limited to a torque output sensor or the like, to determine if the internal combustion engine is running or is not running.

When the vehicle is within the pre-defined distance of the service station, the internal combustion engine is running, and the vehicle is in the ignition on mode, indicated at 36, then the method 20 includes maintaining the operation of the internal combustion engine, indicted by block 38. When the vehicle is within the pre-defined distance of the service station, the internal combustion engine is not running, the vehicle is in the ignition on mode and the speed of the vehicle is less than the pre-defined speed, indicated at 40, the method 20 may further include automatically starting the internal combustion engine, indicated by block 42. The internal combustion engine is automatically started in order to notify the service technician that the vehicle is in the ignition on mode. Having the internal combustion engine running under these conditions indicates to the service technician that the ignition is in the ignition on mode, and that the ignition may need to be switched to the ignition off mode to perform certain service tasks. The service garage maintenance mode maintains operation of the internal combustion engine, i.e., keeps the internal combustion engine running, until the ignition is switched to the ignition off mode, the vehicle is no longer within the pre-defined distance of the service station or until otherwise signaled by a scan tool. This prevents the internal combustion engine from unexpectedly starting automatically as the service technician is servicing the vehicle.

For some service tasks, the service technician may need to examine the vehicle when in the ignition on mode and with the internal combustion engine not running. In order to do so, the service technician may connect a scan tool to the vehicle. The scan tool emits an override signal that disengages the service garage maintenance mode and/or turns the internal combustion engine off, i.e., stops the internal combustion engine from running. Accordingly, the method 20 further includes detecting the presence of the scan tool connected to the vehicle, and detecting an override signal from the scan tool, indicated by block 44. The presence of the scan tool and the override signal may be detected in any suitable manner. The connection of the scan tool to the vehicle, and the transmission of the override signal may be either through a direct plug-in connection or may be through a wireless connection. Once the override signal is detected, indicated at 46, the operation of the internal combustion engine is then stopped, indicated by block 48, even through the vehicle is within the pre-defined distance of the service station, and the vehicle is in the ignition on mode. This allows the service technician to perform the required service tasks. Once the scan tool is disconnected, the internal combustion engine may return to the service garage maintenance mode described above.

While the best modes for carrying out the invention have been described in detail, those familiar with the art to which this invention relates will recognize various alternative designs and embodiments for practicing the invention within the scope of the appended claims.

The invention claimed is:

1. A method of controlling a vehicle having an internal combustion engine capable of automatically starting in response to a pre-defined event, the method comprising:
   detecting the presence of a service station within a pre-defined distance of the vehicle;
   determining if the vehicle is in an ignition on mode or in an ignition off mode;
   determining if the internal combustion engine is running or is not running when the vehicle is in the ignition on mode; and
   automatically starting the internal combustion engine when the vehicle is within the pre-defined distance of the service station, the internal combustion engine is not running, and the vehicle is in the ignition on mode to notify a service technician that the vehicle is in the ignition on mode.

2. A method as set forth in claim 1 further comprising maintaining operation of the internal combustion engine until the vehicle is switched to the ignition off mode when the vehicle is within the pre-defined distance of the service station, the internal combustion engine is running, and the vehicle is in the ignition on mode.

3. A method as set forth in claim 2 further comprising stopping operation of the internal combustion engine when the vehicle is switched from the ignition on mode to the ignition off mode.

4. A method as set forth in claim 3 further comprising detecting the presence of a scan tool connected to the vehicle.

5. A method as set forth in claim 4 further comprising detecting an override signal from the scan tool.

6. A method as set forth in claim 5 further comprising stopping the operation of the internal combustion engine upon detection of the override signal when the vehicle is within the pre-defined distance of the service station, the internal combustion engine is running, and the vehicle is in the ignition on mode.

7. A method as set forth in claim 1 further comprising sensing a speed of the vehicle.

8. A method as set forth in claim 7 wherein automatically starting the internal combustion engine when the vehicle is within the pre-defined distance of the recognized service station, the internal combustion engine is not running, and the vehicle is in the ignition on mode is further defined as automatically starting the internal combustion engine when the vehicle is within the pre-defined distance of the recognized service station, the internal combustion engine is not running, the vehicle is in the ignition on mode, and the speed of the vehicle is less than a pre-defined speed.

9. A method as set forth in claim 8 wherein the pre-defined speed is equal to or less than four miles per hour (4 mph).

10. A method as set forth in claim 1 wherein the pre-defined distance is equal to or less than one hundred feet (100').

11. A method as set forth in claim 1 wherein the pre-defined distance is equal to or less than twenty feet (20').

12. A method as set forth in claim 1 wherein detecting the presence of the service station includes tracking the location of the vehicle with a Global Positioning Satellite device to determine the location of the vehicle.

13. A method as set forth in claim 12 wherein detecting the presence of the service station includes comparing the location of the vehicle to a location of a known service station stored in a memory.

14. A method as set forth in claim 13 wherein the location of the known service station is stored in a memory of the vehicle.

15. A method as set forth in claim 13 wherein the location of the known service station is stored in a memory of a remote computer.

16. A method as set forth in claim 12 wherein detecting the presence of the service station includes receiving a signal indicating that the vehicle is within the pre-defined distance of the service station.

17. A method as set forth in claim 16 wherein the signal is sent from the service station.

18. A method as set forth in claim 16 wherein the signal is sent from a remote location.

19. A method of servicing an extended range electric vehicle or a hybrid vehicle having an internal combustion engine capable of automatically starting in response to a pre-defined event, the method comprising:
   tracking the location of the vehicle with a Global Positioning Satellite device to determine the location of the vehicle;
   comparing the tracked location of the vehicle to a location of a known service station stored in a memory to determine if the vehicle is within a pre-defined distance of the service station;
   determining if the vehicle is in an ignition on mode or in an ignition off mode;
   determining if the internal combustion engine is running or is not running when the vehicle is in the ignition on mode;
   sensing a speed of the vehicle;
   automatically starting the internal combustion engine when the vehicle is within the pre-defined distance of the service station, the internal combustion engine is not running, the vehicle is in the ignition on mode, and the speed of the vehicle is less than a pre-defined speed to notify a service technician that the vehicle is in the ignition on mode;
   maintaining operation of the internal combustion engine until the vehicle is switched to the ignition off mode when the vehicle is within the pre-defined distance of the service station, the internal combustion engine is running, and the vehicle is in the ignition on mode;

detecting an override signal from a scan tool; and stopping the operation of the internal combustion engine upon detection of the override signal when the vehicle is within the pre-defined distance of the service station, the internal combustion engine is running, and the vehicle is in the ignition on mode.

20. A method as set forth in claim 19 further comprising stopping operation of the internal combustion engine when the vehicle is switched from the ignition on mode to the ignition off mode to prevent the internal combustion engine from automatically starting in response to a pre-defined event during service of the vehicle.

\* \* \* \* \*